(12) United States Patent
Feng et al.

(10) Patent No.: US 8,655,383 B2
(45) Date of Patent: Feb. 18, 2014

(54) CONTENT DELIVERY SYSTEM AND METHOD

(75) Inventors: Kyte Feng, Los Angeles, CA (US); Eddy Lo, Los Angeles, CA (US)

(73) Assignee: Alpine Electronics, Inc, Tokyo (JP)

( * ) Notice: Subject to any disclaimer, the term of this patent is extended or adjusted under 35 U.S.C. 154(b) by 193 days.

(21) Appl. No.: 12/484,669

(22) Filed: Jun. 15, 2009

(65) Prior Publication Data
US 2010/0317370 A1 Dec. 16, 2010

(51) Int. Cl.
*H04W 24/00* (2009.01)
(52) U.S. Cl.
USPC ............... 455/456.3; 455/456.1; 455/424
(58) Field of Classification Search
USPC ......... 455/412.1, 456.1, 456.3, 414.2, 424, 455/425, 456.5, 456.6, 550.1, 561, 575, 455/3.01, 179.1, 161.1; 705/26.1
See application file for complete search history.

(56) References Cited

U.S. PATENT DOCUMENTS

| | | | |
|---|---|---|---|
| 6,336,073 B1 | 1/2002 | Ihara et al. | |
| 6,687,608 B2 | 2/2004 | Sugimoto et al. | |
| 7,985,911 B2 * | 7/2011 | Oppenheimer | 84/600 |
| 2002/0177434 A1 * | 11/2002 | Suzuki et al. | 455/412 |
| 2004/0198396 A1 | 10/2004 | Fransioli | |
| 2005/0021665 A1 | 1/2005 | Sekimoto et al. | |
| 2005/0071240 A1 * | 3/2005 | Ewald | 705/26 |
| 2005/0170850 A1 | 8/2005 | Edwards et al. | |
| 2007/0239562 A1 * | 10/2007 | Lawson | 705/26 |
| 2008/0091796 A1 | 4/2008 | Story et al. | |
| 2008/0242280 A1 * | 10/2008 | Shapiro et al. | 455/414.3 |
| 2008/0320078 A1 * | 12/2008 | Feldman et al. | 709/203 |
| 2009/0023406 A1 * | 1/2009 | Ellis et al. | 455/140 |
| 2009/0325556 A1 * | 12/2009 | Lee et al. | 455/414.2 |
| 2010/0088128 A1 * | 4/2010 | Henshaw et al. | 705/5 |

FOREIGN PATENT DOCUMENTS

WO WO 0019646 A1 * 4/2000
WO WO2004/111880 12/2004

* cited by examiner

*Primary Examiner* — Kent Chang
*Assistant Examiner* — Nelson Rosario
(74) *Attorney, Agent, or Firm* — Muramatsu & Associates

(57) ABSTRACT

An apparatus and method provides event notifications to a user according to the user's current location and the content in the user's electronic device. Since the content, such as play counts, a number of songs, etc., may indicate the user's preference about some specific artists, it is possible to establish an intelligent content delivery system according to the user's preference. The content delivery system includes an event searching unit, a playback information retrieving unit and an information processing unit which is configured to determine whether to provide and display the content information by considering factors as distance, future occurrence, ticket availability, etc. of the event.

12 Claims, 18 Drawing Sheets

4 Matches Found

| Conditions | Tier 1 Artist | Tier 2 Artist | Tier 3 Artist |
|---|---|---|---|
| Play-count | Top 2 artist with the most play-count | Next 2 artists with the most play-count | All others artists |
| Number of songs of artist in music library | Top 2 artist with the most songs | Next 2 artist with the most songs | All others artists |
| Distance to search for events | d1 | d2 (shorter than d1) | d3 (shorter than d2) |

FIG. 4i

CONTENT DELIVERY SYSTEM AND METHOD

FIELD OF THE INVENTION

This invention relates to a content delivery system and method. More specifically, this invention is related to an apparatus and method to provide event notifications to a user according to the user's current location and the content in the user's playback device.

BACKGROUND OF THE INVENTION

With remarkable advances in computer, telecommunication and network technologies, information delivery or content delivery service has been proliferating and advancing to deliver not only traditional radio and television signals, but also audio, video or other multimedia contents. The contents can be delivered via cable, satellite, optical fibers, wireless communication networks, or the like. Meanwhile, the contents can be transmitted among various terminals such as personal computers, media players, cellular phones, televisions, or other electronic devices while using different protocols. For example, a user may use the personal computer to transmit traffic information to his or her friend's cellular phone via wireless communication networks, including the Internet.

Furthermore, certain portable electronic devices have been equipped with location determining means, such as a global positioning system (GPS), to determine the current location of the portable device, which enables some content delivery services to provide location-based information to the user to efficiently serve the user. For example, when the user enters a new city or an unfamiliar area, the location-based information, such as dining, lodging, tourist, event information, etc. may be delivered and shown on the user's navigation device, such that the user can have better understanding of the new environment. However, without considering the user's preference, such information may not appropriately serve the user's best need.

U.S. Pat. No. 6,687,608 to Sugimoto et al. discloses a navigation and an information notification system and method displaying service or shop information according to a current position of a user and the user's profile. Furthermore, the navigation system will calculate a route to the shop and display it to the user, as shown in FIG. 1. However, Sugimoto does not disclose anything related to displaying information to the user according to the content stored in the user's portable device and the user's current location.

U.S. Pat. App. Pub. No. 2008/0242280 discloses a method and a system for delivering content to a plurality of user devices configured to communicate via a wireless data network, as illustrated in FIG. 2. The content may include at least one of static, dynamic or on-demand content element, which can be delivered via the wireless data network during different timings. For example, the dynamic content element is delivered substantially according to the schedule, while the on-demand content element is delivered substantially immediately after the user's request. This content delivery method and system, however, does not disclose how to provide a notification to the user according to the content in the user's portable device and the user's current location.

U.S. Pat. App. Pub. No. 2008/0091796 discloses a method and system for delivering customized electronic content over a network, as depicted in FIG. 3. Like Sugimoto, the content can be delivered to a specific user based on the user's profile, such as gender, age, location, etc. In one embodiment, this invention is adapted to deliver a customized content file to a playback device, wherein a user is allowed to subscribe to the customized content provider that delivers customized content file(s) to the user's playback device. Although the user's location is one of the factors considered by the system while delivering the content, the system does not consider the content in the user's playback device to provide most adequate information to the user.

Therefore, there remains a need for a new and improved apparatus and method to deliver content or information to the user. More specifically, the apparatus and method is adapted to provide content or information to the user according to the user's current location and the content in the user's playback device, such that the user may receive location-based information which better serves the user's need and preference.

SUMMARY OF THE INVENTION

It is an object of the present invention to provide a content delivery system which helps a user integrate information from different sources and provides preferable information to the user.

It is another object of the present invention to provide event notification according to a user's current location and content in a user's playback device, for example, a music or multimedia player, such that the user can receive location-based event notification which better serves the user's need and preference.

It is another object of the present invention to search for event information through a plurality of content providers via a communication network.

It is still another object of the present invention to match the event information with playback information (artist names, song names, genres, and favorite sport radio channel) retrieved from the user's playback device, and provide the event information which matches at least a portion of the playback information to the user. The event information may include ticket and album purchasing information and services.

It is a further object of the present invention to search for event information of at least one artist selected by the user and provide the selected artist's event information to the user, if any.

It is a further object of the present invention to divide the artists in the playback information into different tiers and a predetermined searching distance for each tier in a descending order. For example, the event searching distance for the tier one artists is the longest, for tier two is shorter, and so on.

It is still a further object of the present invention to detect arrival of a new city and provide event information in the new city to the user.

According to one aspect of the present invention, a content delivering system may include a first content retrieving unit to search for a first content from at least one communication interface; a second content retrieving unit to retrieve a second content from at least one electronic device; a user interface configured to display at least a portion of the first content; a position and distance measuring unit to detect a current position of a user and determine a distance between the user's current position and a destination; an information processing unit which compares the information between the first and second content and if there is any match found and determines whether to provide the first content information to the user; and a user interface adapted to display at least a portion of the first content information to the user. In one embodiment, the first content may include event information, which includes art, concert or sport events, which can be transmitted from at least one content provider to the communication interface, including a remote server, the Internet or the like, from which the first content retrieving unit is adapted to search for the event information. In another embodiment, the event information can be transmitted to the remote server or the Internet (e.g. Ticketmaster, MSNDirect) from at least one content provider via wireless communication.

The second content includes playback information in the electronic device, including but not limited to artist names, song names, song attributes, play counts, favorite radio stations, etc. In one embodiment, the electronic device is an in-vehicle device. In another embodiment, the electronic device is a portable device. In a further embodiment, the electronic device is a portable communication device.

As stated above, the information processing unit compares the event information received by the first content retrieving unit with the playback information retrieved by the second content retrieving unit, and if the event information, for example, the singer of the concert, cannot be found in the playback information, the event information may not be provided to the user. On the other hand, if there is at least one match between the first content and the second content, the information processing unit is configured to analyze a plurality of factors including, but not limited to, "whether the event takes place within a predetermined distance from the user's current location," "future event occurrence," and "event ticket availability", etc. If at least one factor is negative, for example, the event is not within the predetermined distance from the user's current location, the event information may not provide to the user. In other words, the content delivery system in the present invention is configured to deliver location-based information according to the user's preference.

In one embodiment, the content delivery system in the present invention can be embedded in an in-vehicle navigation system, such that the user can receive event notifications along the route or at the destination while driving. In another embodiment, the content delivery system can be embedded in a portable navigation system to provide event information to the user in different means of transportation, such as car, bus, train, boat, etc. In a further embodiment, the content delivery system can be integrated into the playback device.

In another embodiment, the user is allowed to retrieve at least one specific artist's event information in the present invention by simply selecting the artist's name in the playback information. Similarly, the information processing unit is adapted to match the event and playback information and analyze a plurality of factors to determine whether to provide the artist's event information to the user.

In a further embodiment, the information processing unit in the content delivery system divides the artists in the playback information into different tiers according to at least a portion of the playback information, such as play count, number of songs, etc., which may highly indicates the user's preference of the music or artist, and assigns an event searching distance to each tier. For example, the information processing unit may define the artists of the highest play count and highest number of songs in the playback device as tier one artists, and assigns a longest event searching distance to the event of the tier one artists, a shorter event searching distance to the tier two artists, and so on.

Since most events (art, sport, concert, etc.) are held in cities with certain amount of populations, the content delivery system in the present invention may further include a new city detecting unit communicatively coupled with the position and distance measuring device and at least one map information memory to detect whether the user is entering into a new city. If the user is approaching or entering the new city, the first content retrieving unit is triggered to retrieve event information therein, the second content retrieving unit then retrieves content from the playback device, and the information processing unit determines whether to deliver the even information to the user.

In another aspect, a method of providing event information to a user includes the steps of: retrieving first content information from at least one communication interface; retrieving a second content from at least one electronic device; detecting a current position of the user and determining a distance between the user's current position and a destination; determining whether to deliver and display at least a portion of the first content to the user; and displaying at least a portion of the first content to the user on a user interface.

In one embodiment, the step of retrieving the first content information from at least one communication interface includes the step of transmitting the first content information from at least one content provider to the communication interface via wireless communication. As depicted above, the communication interface can be a remote server, the Internet or the like. The step of retrieving a the second content from at least one electronic device includes the step of retrieving playback information including, but not limited to, artist names, song names, song attributes, play counts, favorite radio stations, or user profile.

In some embodiments, the step of detecting a current position of the user may include the step of receiving location information of the user from a global positioning system (GPS). The step may further include a step of detecting whether the user is entering a new city by utilizing the new city detecting unit communicatively coupled with a position and distance measuring device and at least one map information memory. If the user is entering a new city, the event information in the new city is thus transmitted from at least one content provider via wireless communication.

The step of determining whether to deliver and display at least a portion of the first content information to the user includes the step of matching the first and second content information. If there is no matching information found, the content delivery system will continue to search for the event information. On the contrary, if there is matching information found, the step of determining whether to deliver and display the first content to the user may further include a step of analyzing a plurality of factors as stated above to determining whether to deliver and display the first content. In some embodiments, the step of displaying the first content to the user on a user interface includes a step of displaying the ticket and album purchasing information on the user interface.

The method of providing event information to a user may further include a step of selecting at least one artist from the playback information to retrieve the artist's event information. Once the user selects the at least one artist from the playback information, the information processing unit determines whether to provide the selected artist's event information to the user as stated above.

The step of determining whether to deliver and display at least a portion of the first content information to the user further comprises the step of dividing the artists in the playback information into different tiers according to at least a portion of the playback information indicating the user's preference, and assigning different searching distances to each tier. As illustrated above, the longest searching distance to search for event information of the artists is assigned to the tier one, and the searching distance is descending in each tier therefrom.

The present invention together with the above and other advantages may best be understood from the following detailed description of the embodiments of the invention illustrated in the drawings below.

BRIEF DESCRIPTION OF THE DRAWINGS

FIGS. 4i and 4j illustrate a further embodiment disclosed in the present invention which provides event notification to the user according to the user's current location and playback information in a playback device.

DETAILED DESCRIPTION OF THE INVENTION

The detailed description set forth below is intended as a description of the presently exemplary device provided in accordance with aspects of the present invention and is not intended to represent the only forms in which the present invention may be prepared or utilized. It is to be understood, rather, that the same or equivalent functions and components may be accomplished by different embodiments that are also intended to be encompassed within the spirit and scope of the invention.

Unless defined otherwise, all technical and scientific terms used herein have the same meaning as commonly understood to one of ordinary skill in the art to which this invention belongs. Although any methods, devices and materials similar or equivalent to those described can be used in the practice or testing of the invention, the exemplary methods, devices and materials are now described.

All publications mentioned are incorporated by reference for the purpose of describing and disclosing, for example, the designs and methodologies that are described in the publications which might be used in connection with the presently described invention. The publications listed or discussed above, below and throughout the text are provided solely for their disclosure prior to the filing date of the present application. Nothing herein is to be construed as an admission that the inventors are not entitled to antedate such disclosure by virtue of prior invention.

This invention relates to an apparatus and method to provide event notifications to a user. More specifically, this invention is related to an apparatus and method to provide event notifications to the user according to the user's current location and the content in the user's playback device. Since the content, such as play count, number of songs, etc., may indicate the user's preference about some specific artists, this invention is particularly related to an intelligent content delivery system adapted to provide event notification to the user according to the user's preference.

Figure 1:
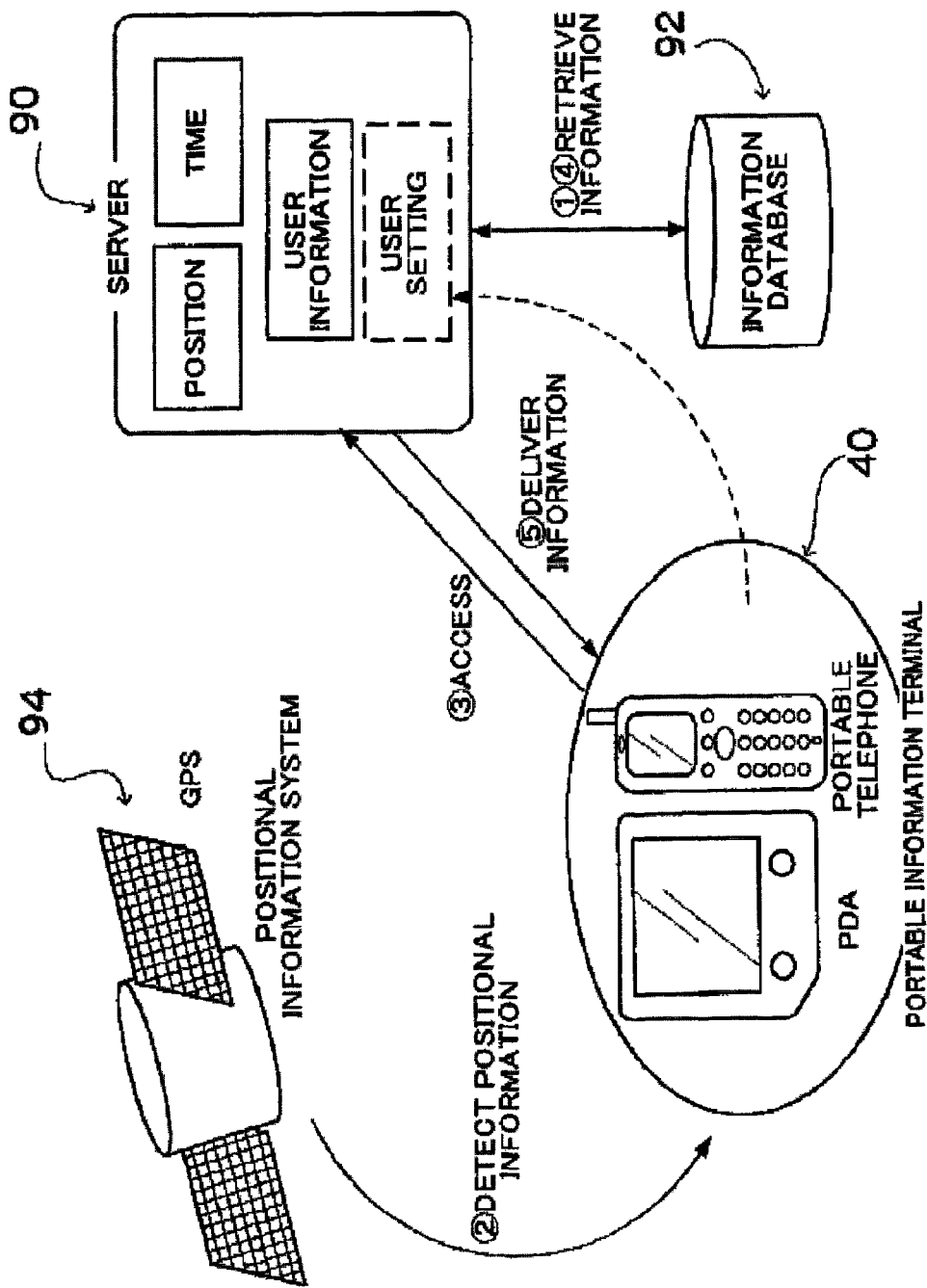
FIG. 1 illustrates a prior art disclosing a navigation and an information notification system and method displaying service or shop information according to a current position of a user and the user's profile.
Figure 2:
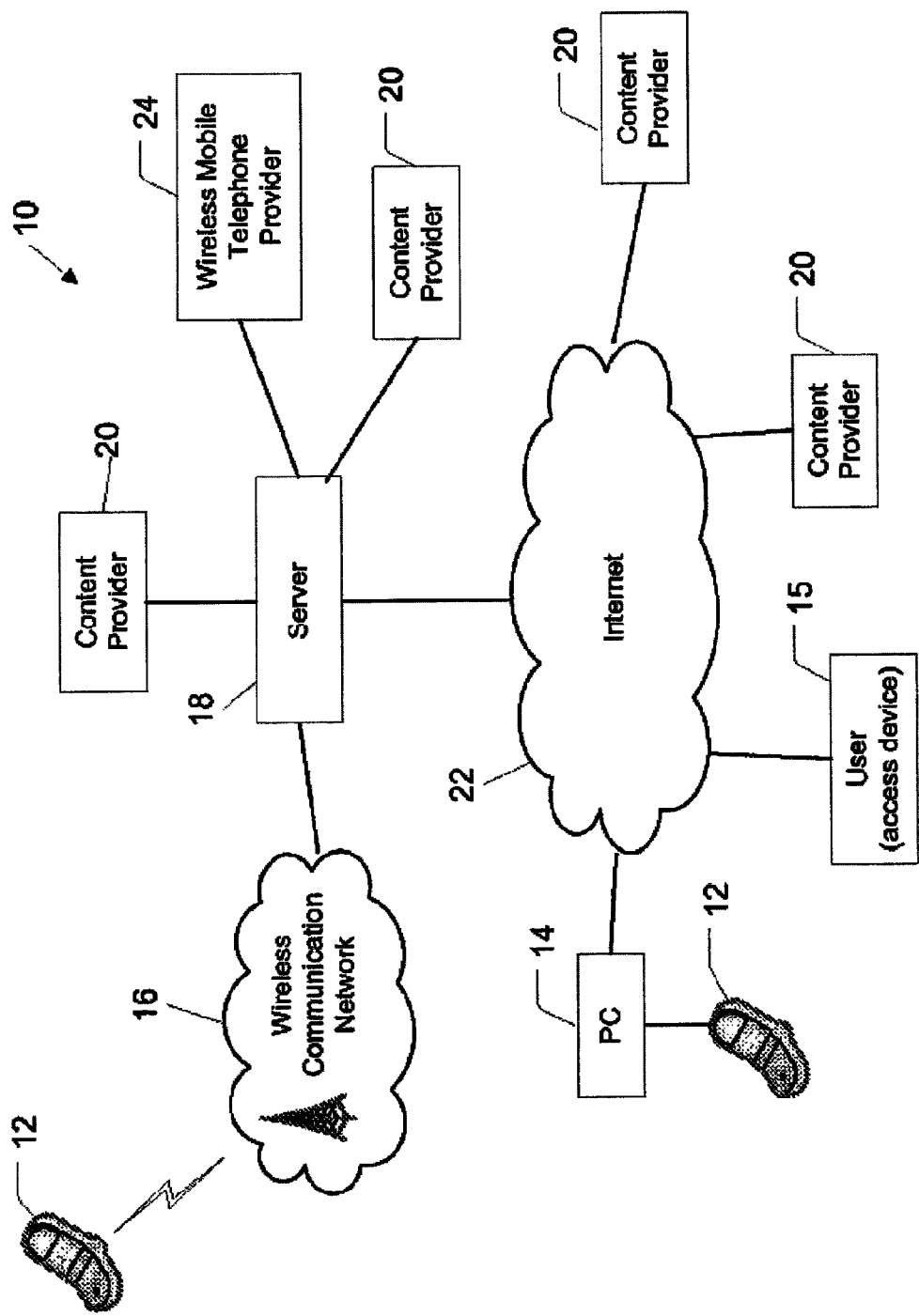
FIG. 2 illustrates a prior art disclosing a method and a system for delivering content to a plurality of user devices configured to communicate via a wireless data network.
Figure 3:
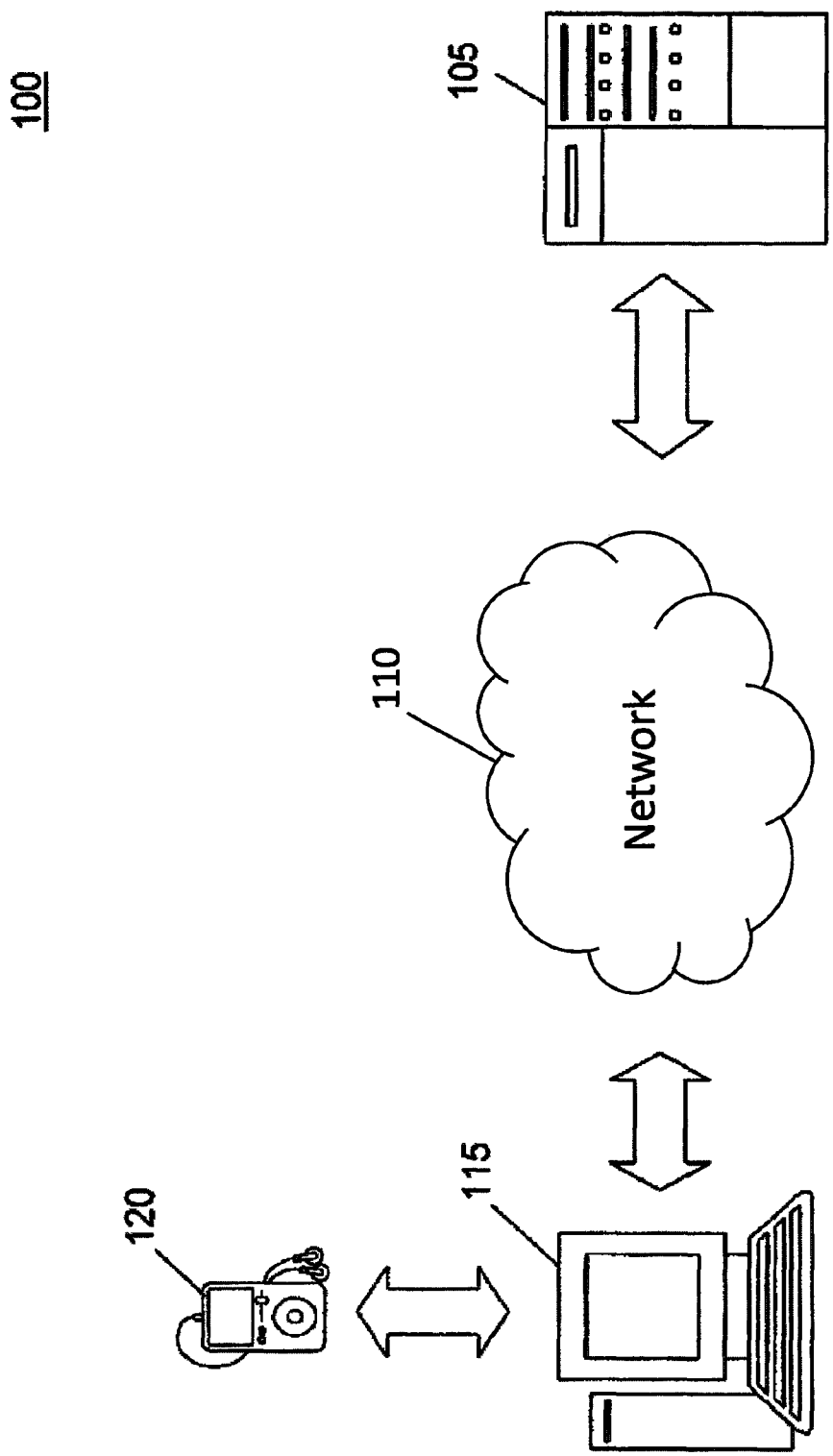
FIG. 3 illustrates a method and system for delivering customized electronic content over a network, wherein the content can be delivered to a specific user based on the user's profile, such as gender, age, location, etc.
Figure 4:
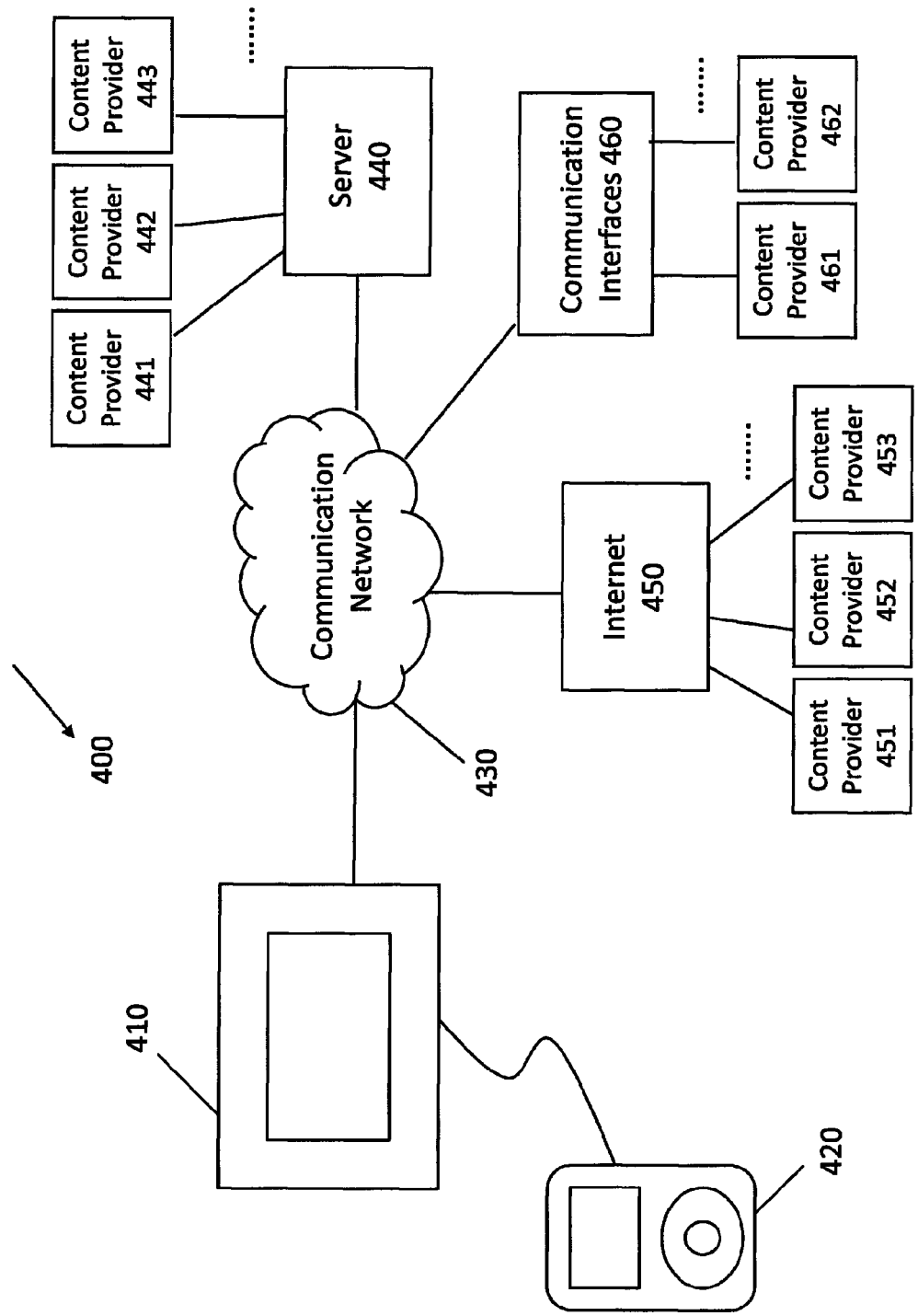
FIGS. 4 and 4a illustrate a content delivery system disclosed in the present invention to provide event notification to the user according to the user's current location and playback information in a playback device.

Referring to FIG. 4, a content delivery system 400 comprises an information terminal 410 communicatively coupled to a playback device 420 to retrieve playback information, such as artist names, song names, number of songs, play counts, favorite radio stations, etc. The information terminal 410 is also communicatively coupled with a communication network 430 through which the content, for example, the event information, can be transmitted to the information terminal 410. More specifically, for example, at least one content provider (441, 442 or 443) may stream the event information to a server 440, and the information terminal 410 may search for and receive the content information from the server 440 via the communication network 430. Likewise, the terminal 410 can receive event information from at least one content provider (451, 452 or 453) through the Internet 450 via the communication network 430. Similar content delivery scheme can be applied to other communication interfaces 460 linking to content providers 461 and 462. According to one embodiment in FIG. 4a, the information terminal 410 can be integrated into the playback device 420 to become a multifunctional electronic device 415.

Figure 4A:
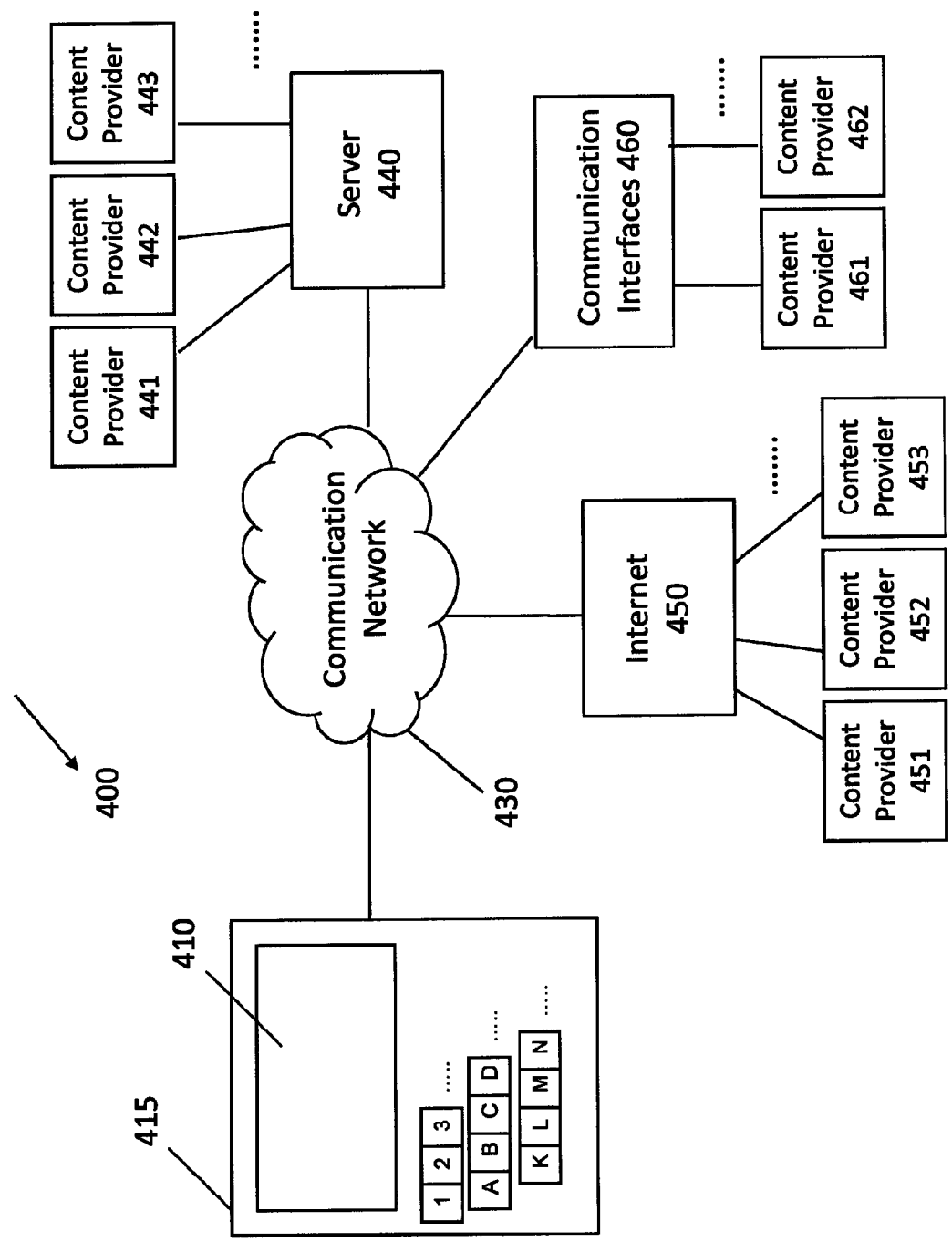
Figure 4B:
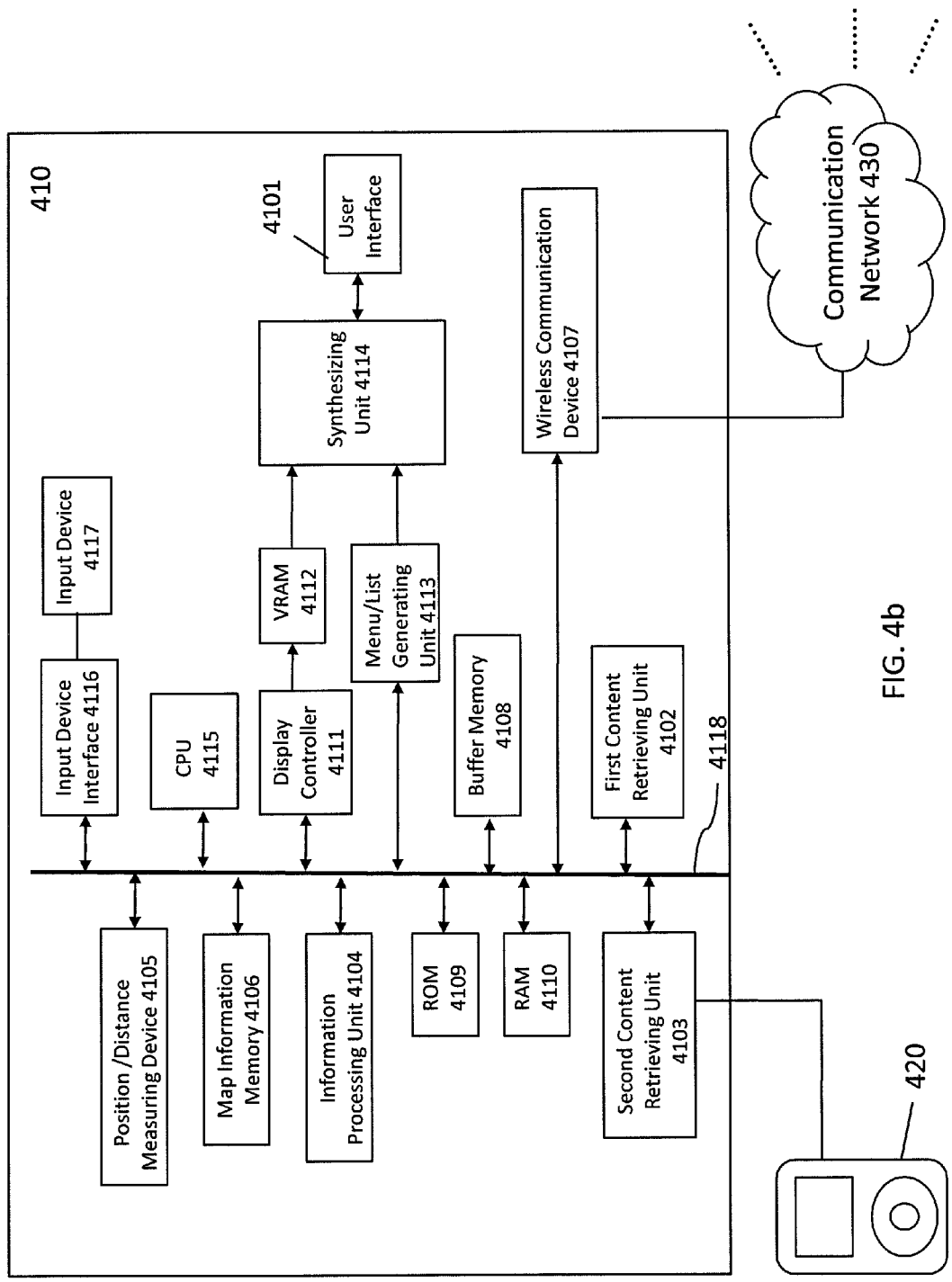
FIG. 4b illustrates a functional block diagram showing an example of structure of an information terminal in the content delivery system to provide event notification to the user according to the user's current location and playback information in a playback device.

FIG. 4b is a block diagram illustrating an example of structure of the information terminal 410 for implementing the present invention. As can be seen in FIG. 4b, the information terminal 410 comprises a user interface 4101; a first content retrieving unit 4102 communicatively coupled with a wireless communication device 4107 to receive the first content, i.e. event information, through the communication network 430; and a second content retrieving unit 4103 is adapted to retrieve playback information from the playback device 420, as stated above.

The information terminal 410 also includes a position and distance measuring device 4105 to detect the current position of the user and determine a distance between the user's current position and a destination; and a an information processing unit 4104 which is used to compare the first content (e.g. event information) with the second content (e.g. playback information), and determine whether to display and provide event information to the user via the user interface 4101. In one embodiment, the information processing unit 4104 compares the event information and the playback information, and analyzes a plurality of factors such as "whether event takes place within a predetermined distance from the user's current location," "future occurrence of the event," "event ticket availability," etc. to determine whether to provide the event information to the user. The position and distance measuring device 4105 has a speed sensor for detecting a moving distance, a gyroscope for detecting a moving direction, a microprocessor for calculating a position, a GPS (global positioning system) receiver for receiving GPS signals from satellites for calculating a current position of the user.

Still referring to FIG. 4b, the terminal 410 includes a bus 4118 for interfacing the above units in the terminal, a processor (CPU) 4115 for controlling an overall operation of the terminal 410, a ROM 4109 for storing various control programs, a RAM 4110 for storing a processing result such as an event notification, a display controller 4111 for generating image, if any, on the basis of the event information, a VRAM 4112 for storing images generated by the display controller 4111, a menu/list generating unit 4113 for generating menu image/various list images, a synthesizing unit 4114, and a buffer memory 4108 for temporary storing data for ease of data processing.

Figure 6:
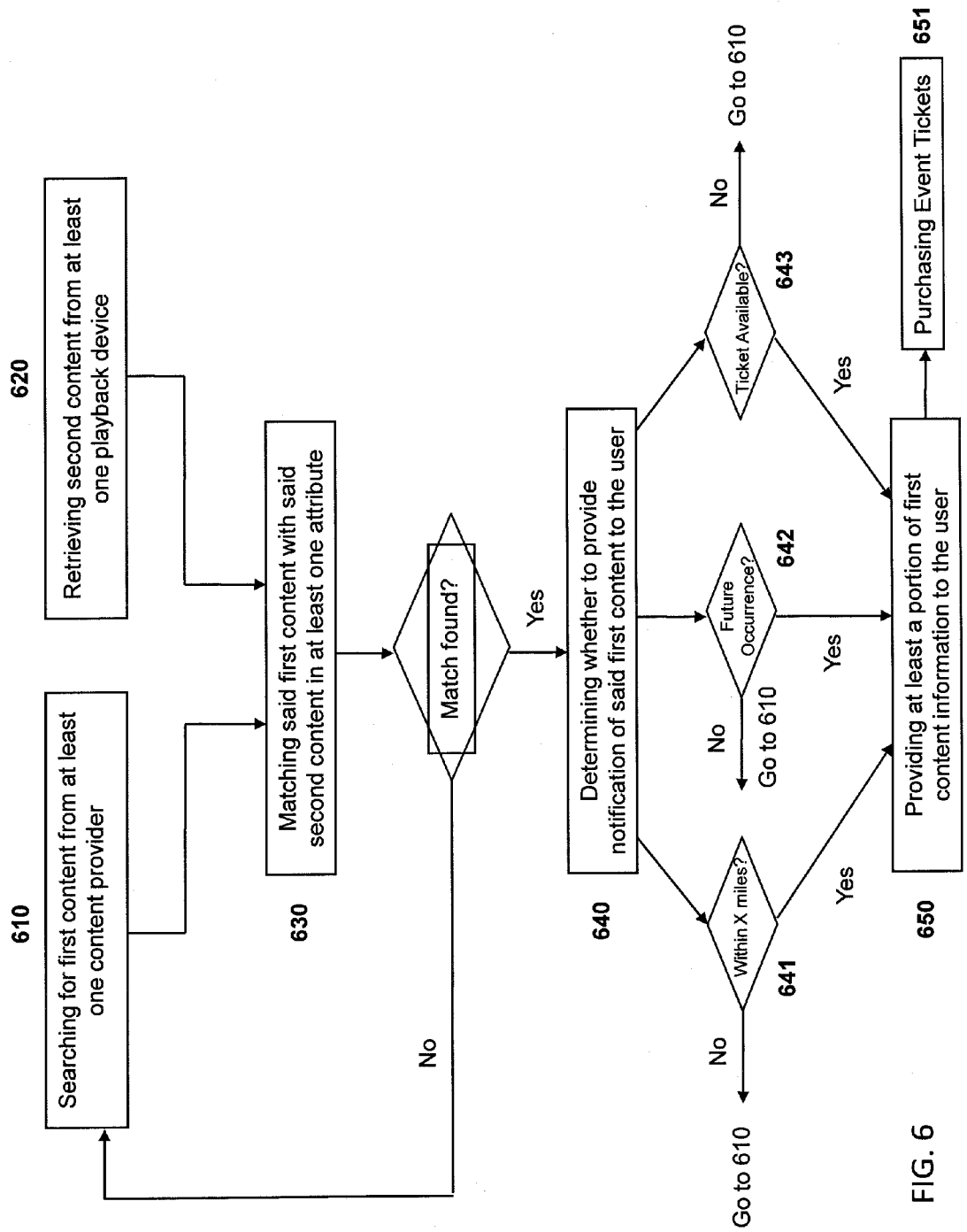
FIG. 6 is a flowchart illustrating operational steps of a method for providing event information to a user according to the user's current location and playback information in a playback device.
Figure 7:
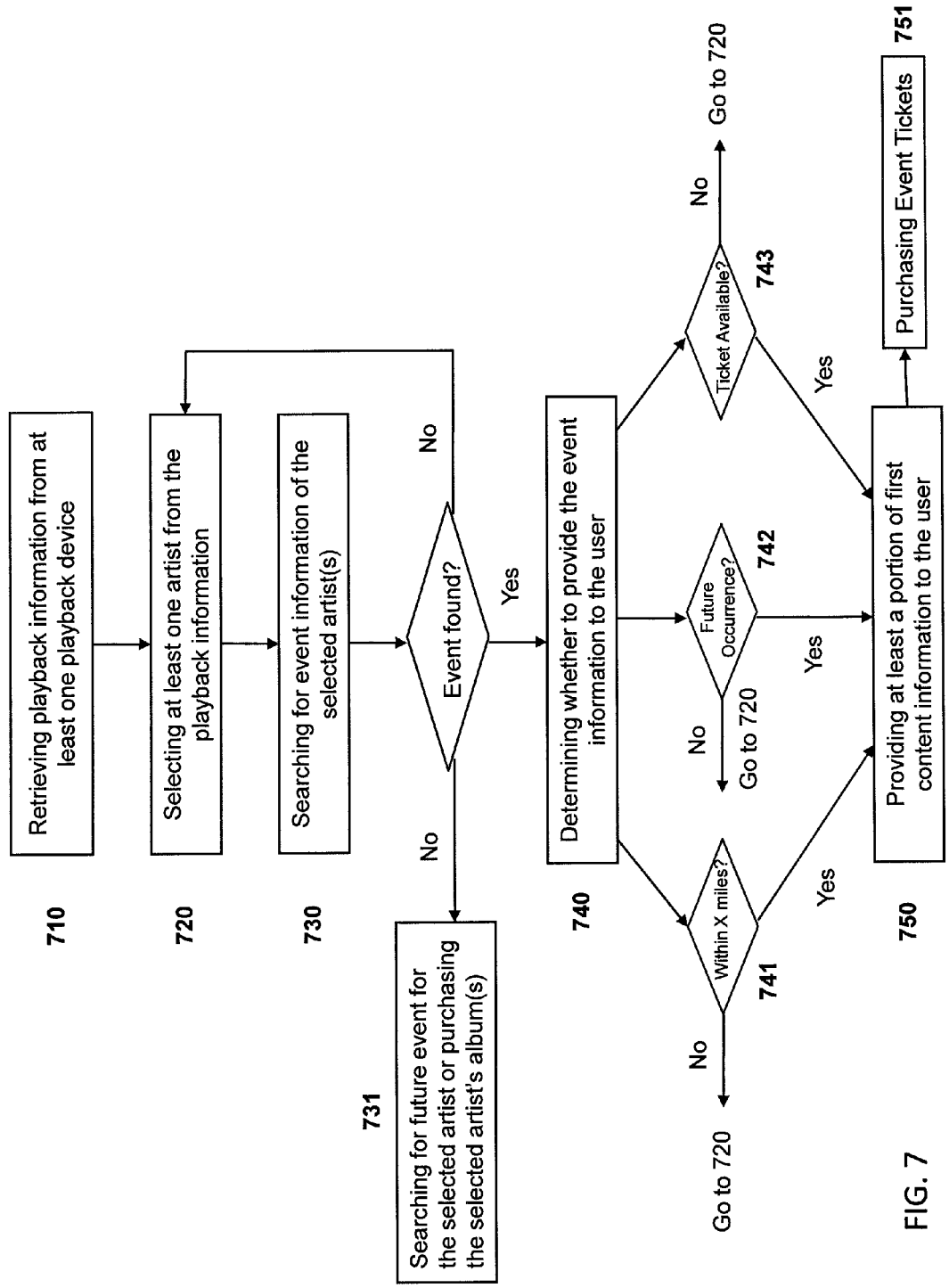
FIG. 7 is a flowchart illustrating operational steps of one embodiment of the method for providing event information to a user according to the user's current location and playback information in a playback device.
Figure 8:
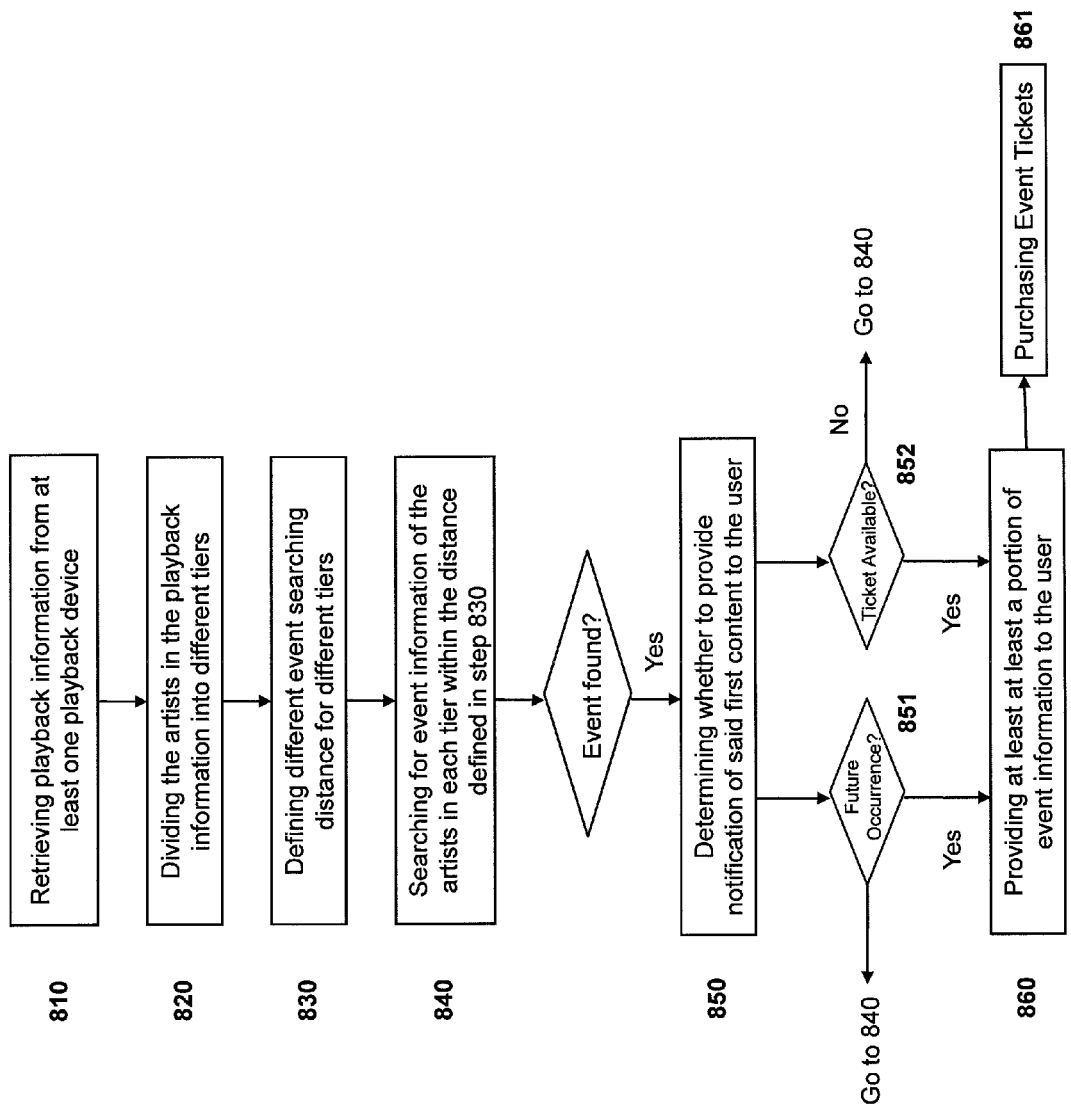
FIG. 8 is a flowchart illustrating operational steps of another embodiment of the method for providing event information to a user according to the user's current location and playback information in a playback device.

A program for conducting the operation of providing event notification in the present invention shown in the flow charts of FIGS. 6 to 8 is stored in the ROM 4109 or other memory and is executed by the CPU 4115. The CPU 4115 controls an overall operation of the content delivery system in the present invention.

Figure 4C:
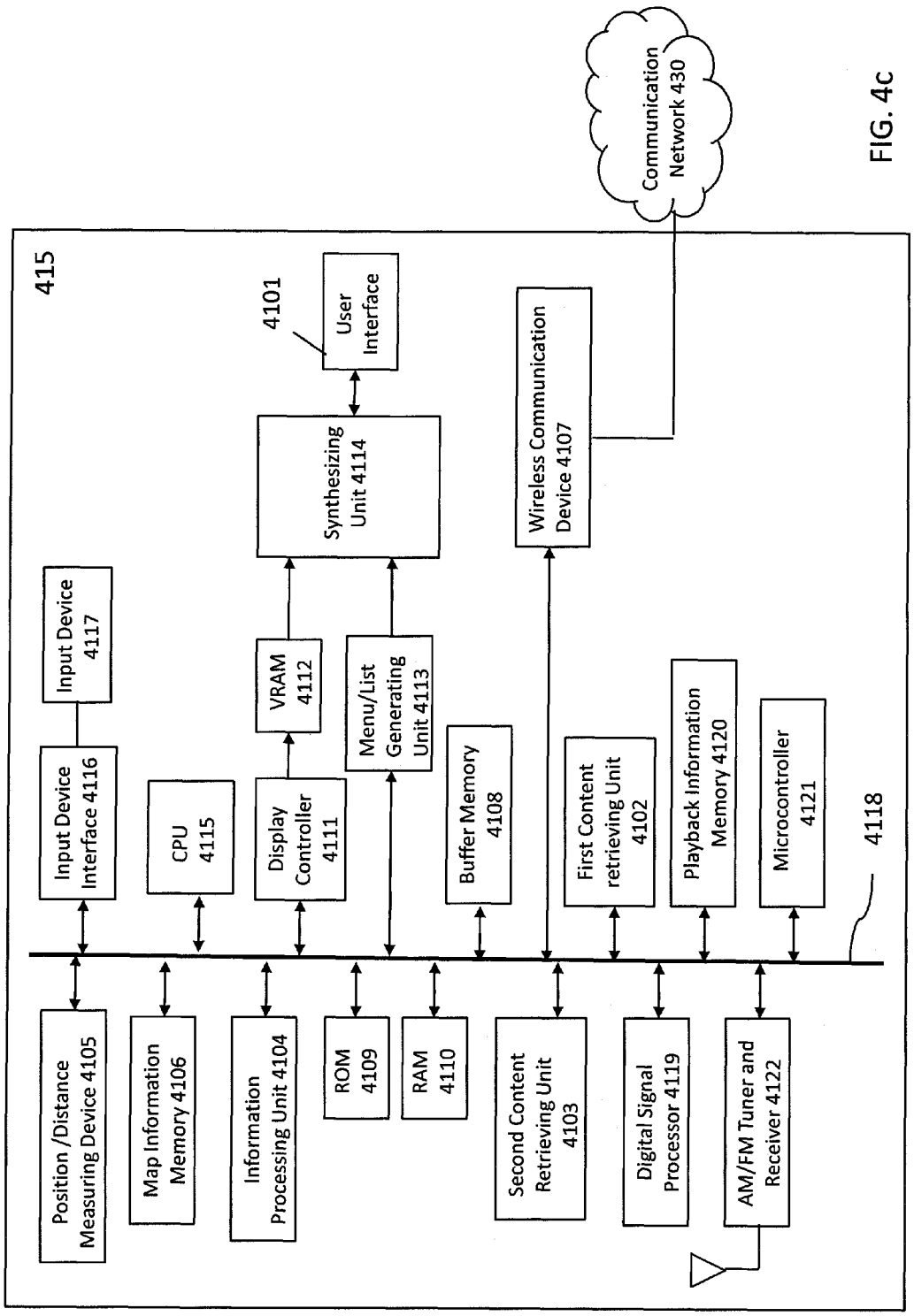
FIG. 4c illustrates a functional block diagram showing an example of structure of a multifunctional electronic device in the content delivery system to provide event notification to the user according to the user's current location and playback information in the electronic device.

FIG. 4c is a block diagram illustrating an example of structure of the multifunctional electronic device 415 in FIG. 4a for implementing the present invention. In addition to the elements described above in the information terminal 410, the multifunctional electronic device 415 comprises a digital signal processor 4119; a playback information memory 4120 adapted to store media files and playback information as stated above; a microcontroller 4121 programmed to handle and control the information generated from the input device 4117 and the information flow; and an AM/FM Tuner and Receiver 4122. Like the information terminal 410, the multifunctional electronic device 415 is communicatively coupled with the communication network 430 to search and receive the event information from at least one content provider. In one embodiment, the multi-functional electronic device 415 can be a mobile communication device with playback function. In another embodiment, the multi-functional electronic device 415 can be an in-vehicle head unit.

Figure 4D:
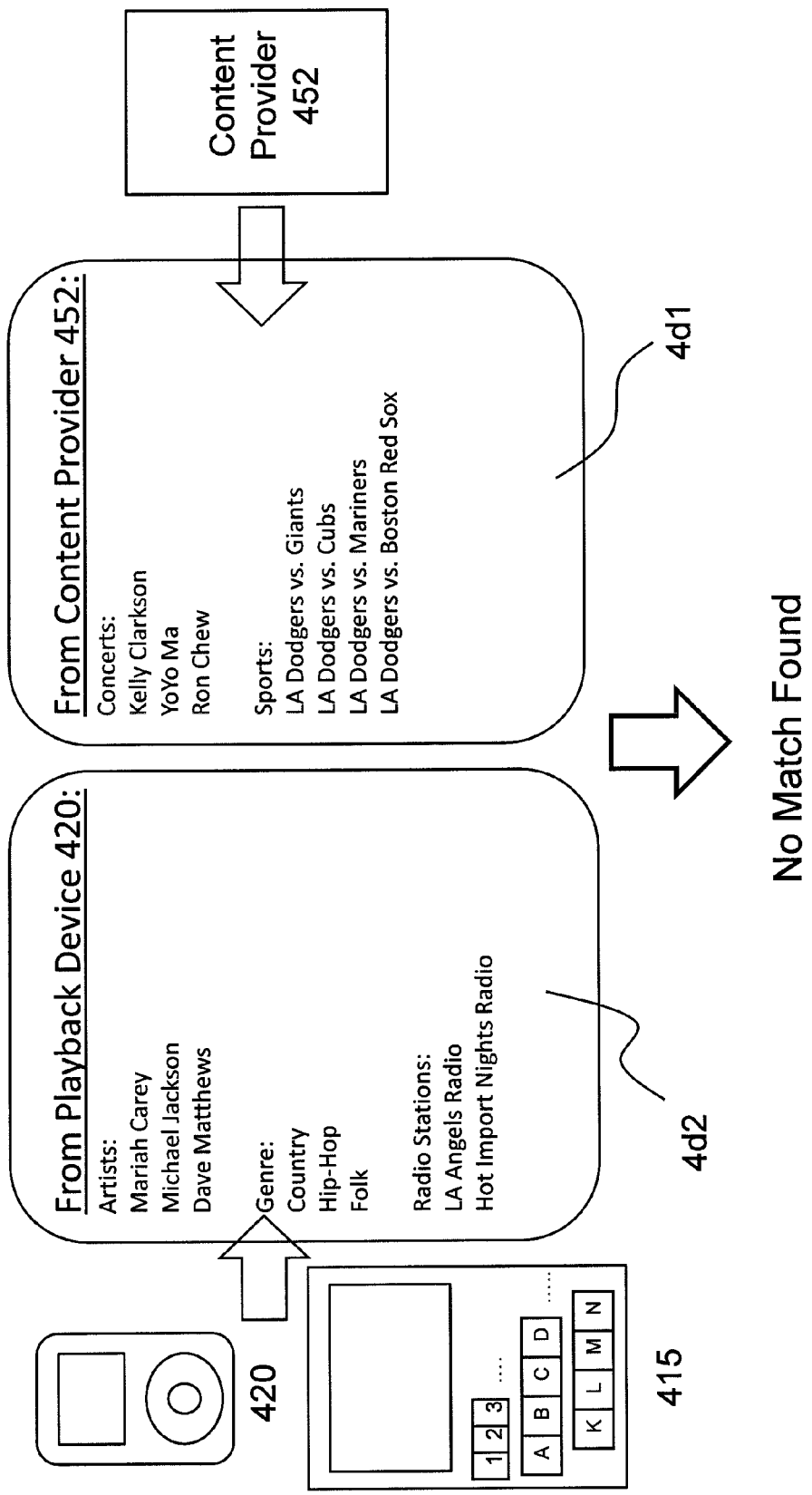
FIGS. 4d to 4f illustrate one embodiment disclosed in the present invention which provides event notification to the user according to the user's current location and playback information in a playback device.

According to one embodiment in FIG. 4d, one of the content providers, for example the content provider 452 in FIG. 4, provides concert and sport information 4d1 to the first content retrieving unit 4102, the playback device 420 or the multifunctional electronic device 415 provides the playback information 4d2 (artist names, song genres, favorite sport radios, etc.) to the second content retrieving unit 4103, and the information processing unit 4104 is adapted to determine whether to provide the event information 4d1 to the user. As can be seen in FIG. 4d, there may be no match between the information 4d1 and 4d2 because not only there is no matching genres, but also the singers of the concert events (Kelly Clarkson, YoYo Ma and Ron Chew) cannot be found in the information 4d2 retrieved from the user's playback device 420. Furthermore, the user's favorite baseball team may be LA Angels according to the information 4d2, which does not match the sport event, i.e. the Dodgers baseball games, in the information 4d1. Under these circumstances, the information processing unit 4104 may determine not to display any event information in 4d1 to the user.

Figure 4E:
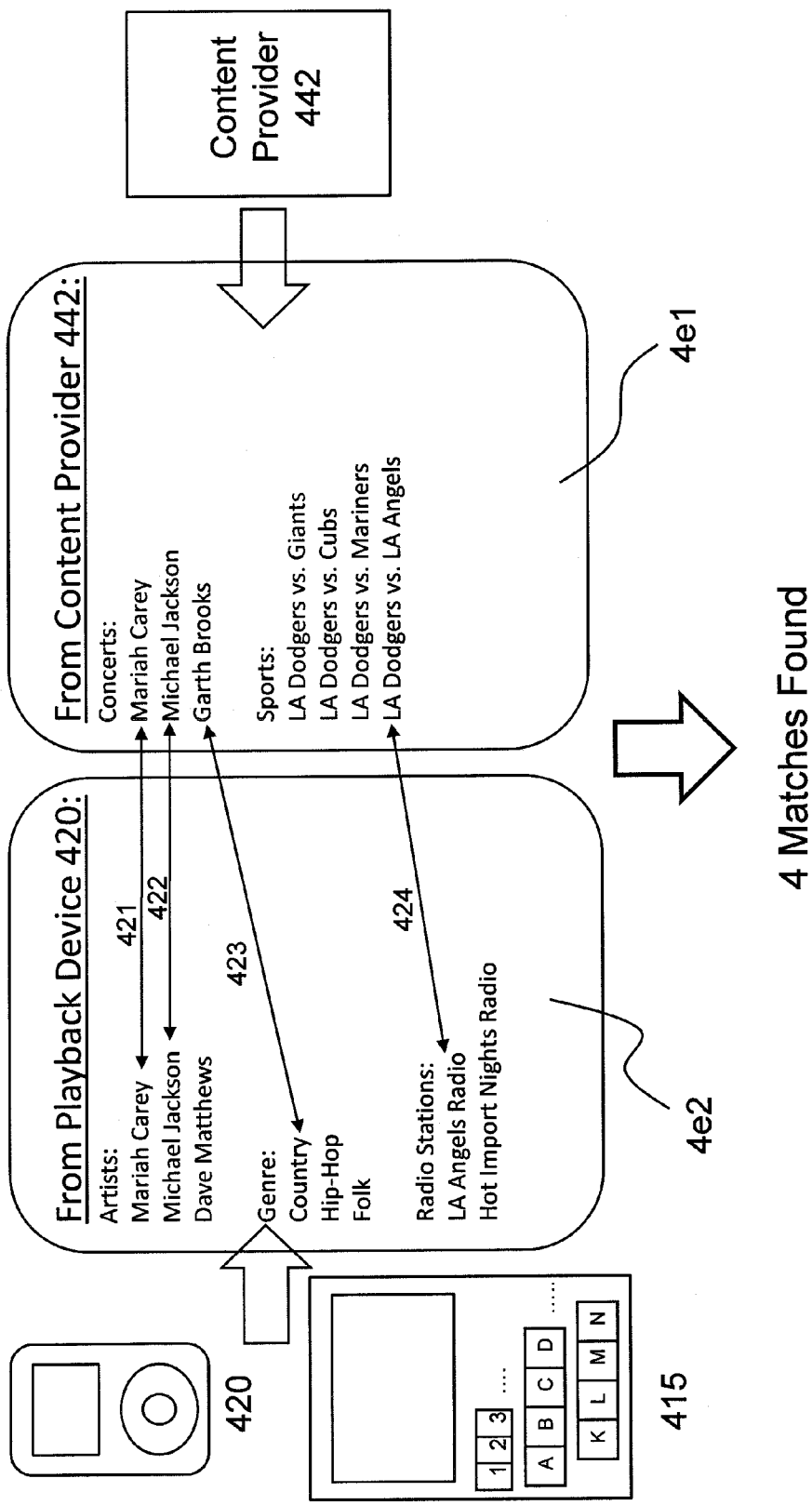
Figure 4F:
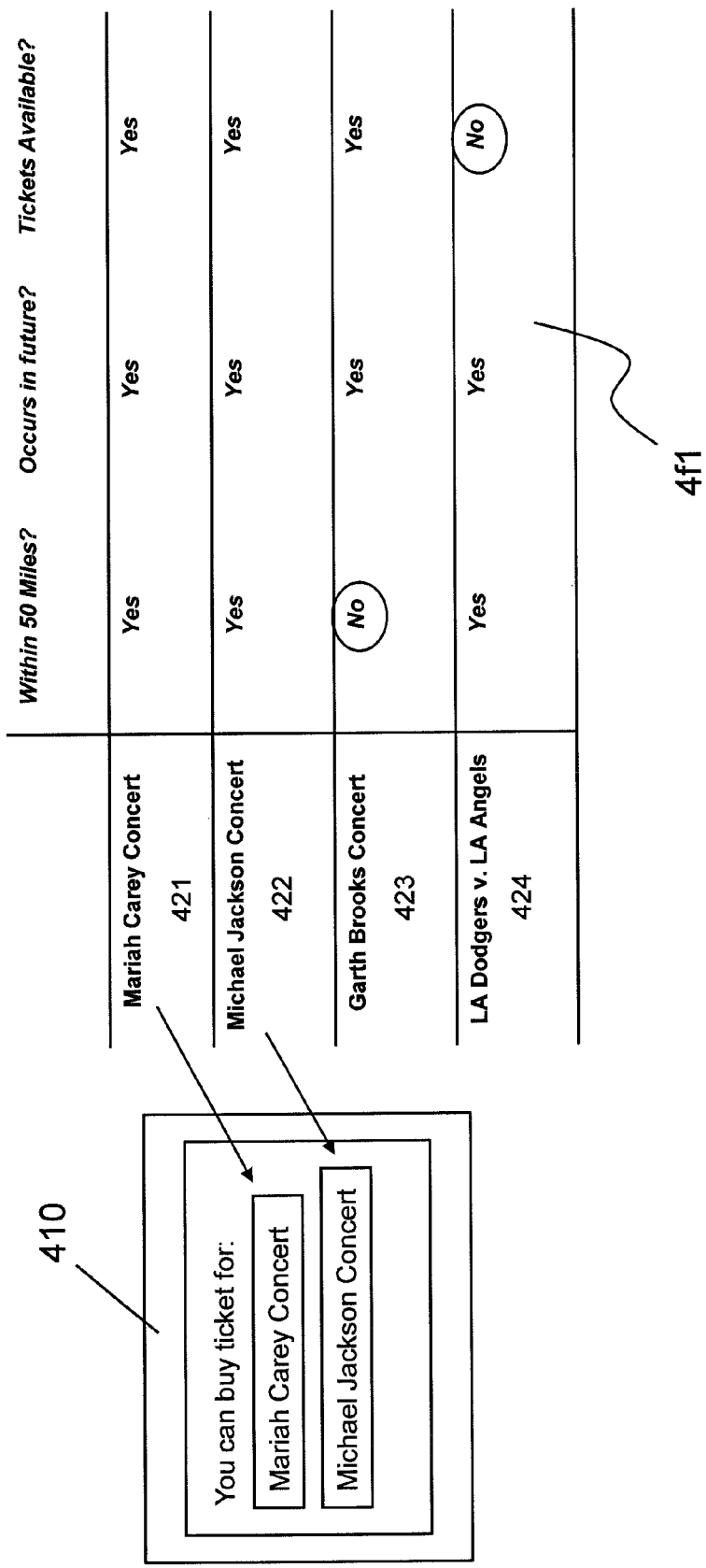

Referring to FIG. 4e, if the information processing unit 4104 discovers at least one match between the information 4e1 provided by the content provider 442 and the information 4e2 provided by the playback device 420 or the multifunctional electronic device 415, the information processing unit 4104 is configured to further determine whether to display the matching event information 421, 422, 423 and 424 to the user. In one embodiment, the information processing unit 4104, as illustrated in FIG. 4f, further process the matching event information 421 to 424 by analyzing a plurality of factors such as distance (whether the event within a predetermined distance from the current position), future occurrence of the event, ticket availability of the event, etc. As discussed above, the information processing unit 4104 can communicatively couple with the position and distance measuring device 4105 via the bus 4118 to determine the distance between the user's current position and the location of the event. If the event is within a predetermined distance, for example, fifty miles, the event information may be provided to the user, such as the event information 421, 422 and 424. On the other hand, if the event is not within a predetermined distance, the event information may not be provided to the user, such as the event information 423. In another embodiment, the user can modify the predetermined distance based on the user's preference.

As to the future occurrence and ticket availability of the event, such information can be provided by one of the content providers. In another embodiment, the information processing unit 4104 may be coupled with the first content retrieving unit 4102 to obtain such information from the server 440, the Internet 450 or other communication interfaces 460 via the communication network 430. As can be seen in FIG. 4f, the event information 424 may not be provided to the user since the ticket is not available. Thus, after analyzing a plurality of factors as illustrated in table 4f1, the information processing unit 4104 may determine to display only the event information 421 and 422 on the information terminal 410 and the user is allowed to purchase the event ticket on the information terminal 410.

Figure 4G:
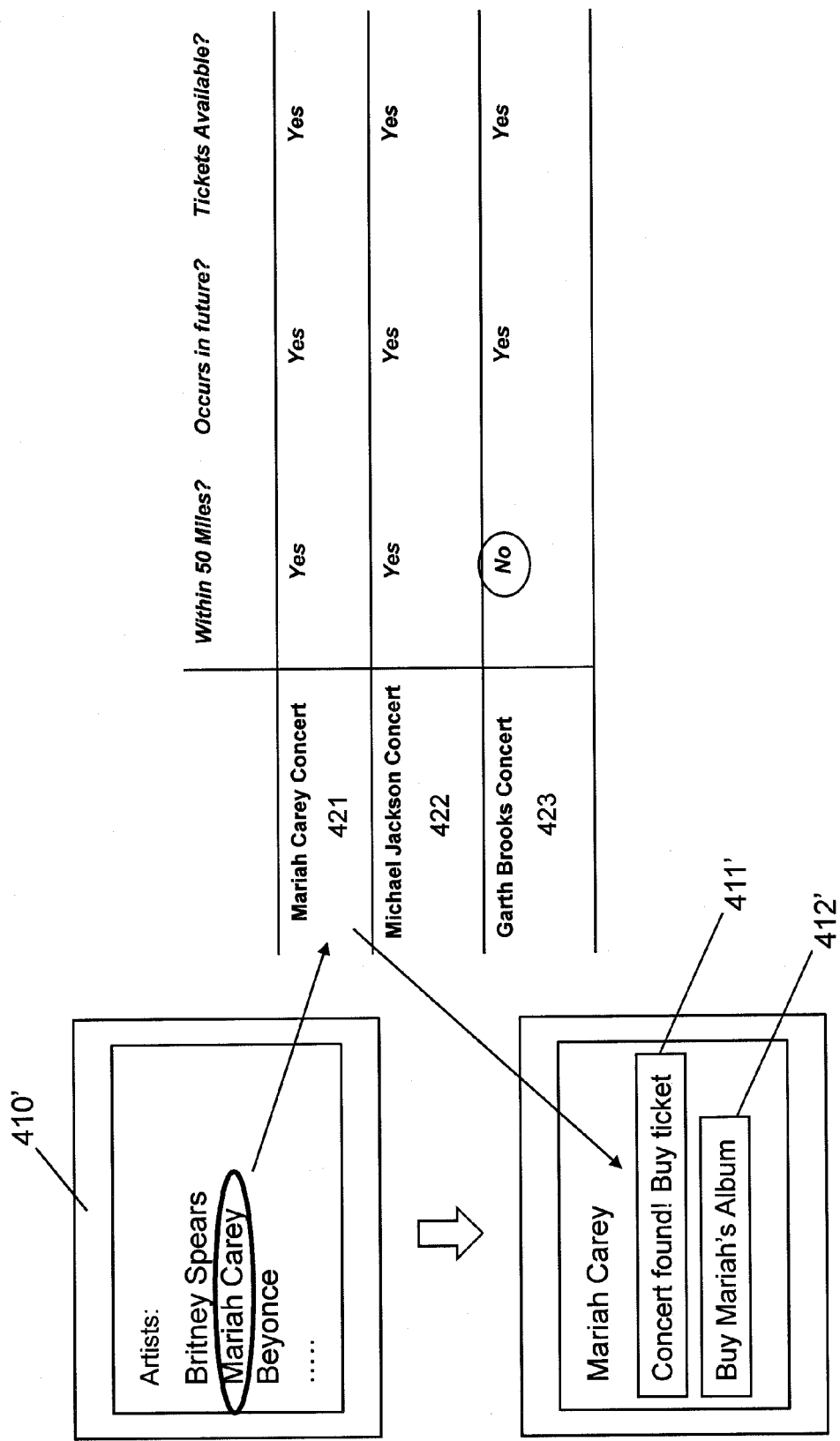
FIGS. 4g and 4h illustrate another embodiment disclosed in the present invention which provides event notification to the user according to the user's current location and playback information in a playback device.

In a further embodiment, the user may search for the event information according to an artist list in the playback device 420. More particularly, the user is allowed to select at least one artist name retrieved from the playback device 420 to receive event information from the specific artist within the predetermined distance. As depicted in FIG. 4g, if the user wants to know whether Mariah Carey has a concert within the predetermined distance, for example, fifty miles from the user's current location, the user can simply click on Mariah Carey's name on a terminal 410' and the information processing unit 4104 is adapted to retrieve the event information from the server 440, the Internet 450 or other communication interfaces 460 via the communication network 430. Once the user receives Mariah Carey's event information 421, the user can purchase the event ticket(s) from the terminal 410' by clicking the button 411', or purchase the artist's album(s) by clicking button 412'.

Figure 4H:
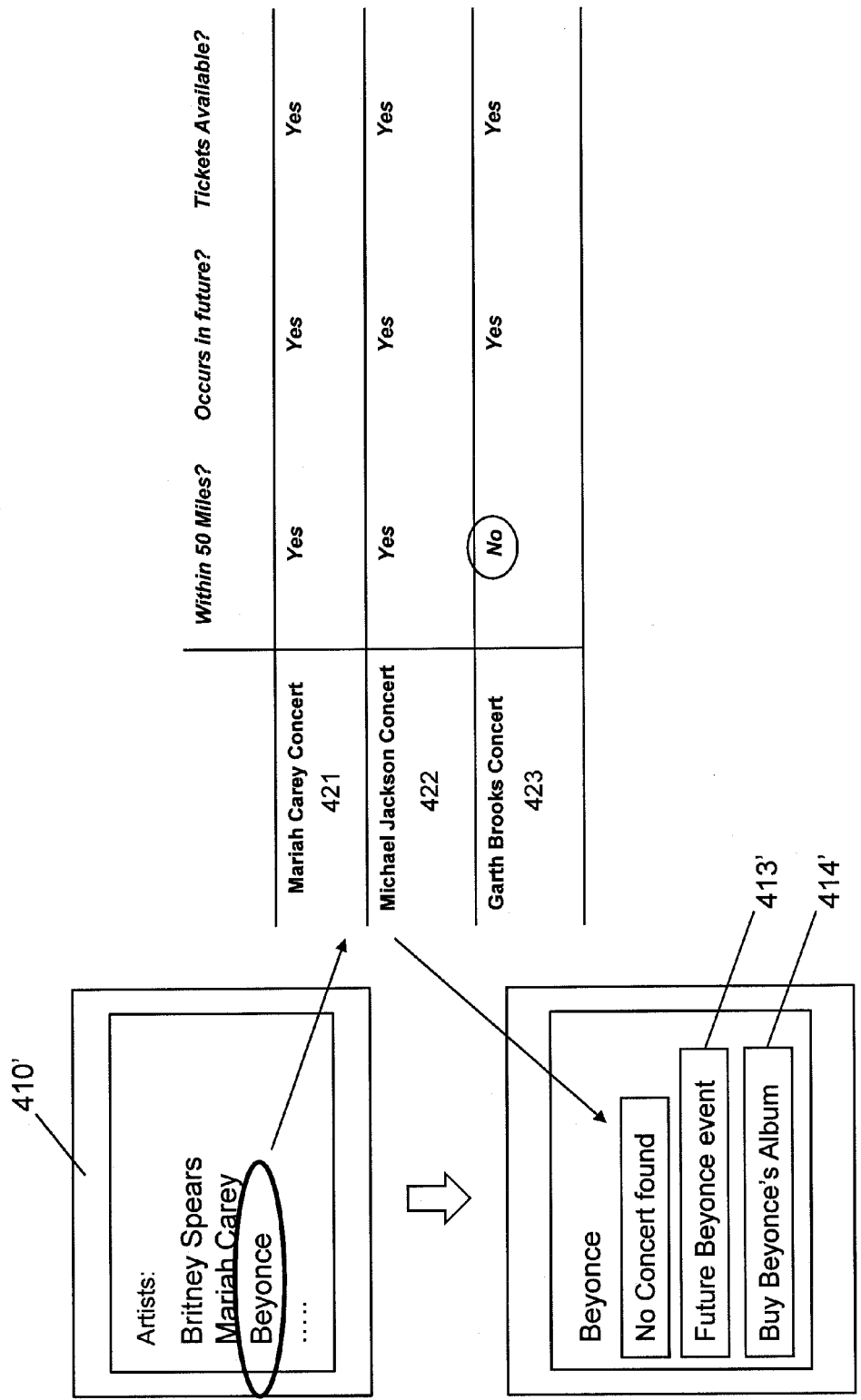

On the other hand, if the artist selected by the user, for example, as shown in FIG. 4h, "Beyonce" does not have any matching event information, the user can still purchase Beyonce's album(s) by clicking button 414' or research Beyonce's future events by clicking button 413' on the terminal 410'.

In a further embodiment shown in FIG. 4i, since the playback information may highly indicate the user's preference, the information processing unit 4104 may modify the event searching distance (e.g., fifty miles in previous examples), according to the playback information in the playback device 420. For example, if the playback information indicates that the user likes one specific singer's songs, the searching distance of the specific singer's event can be modified longer than any other singers. To achieve this goal, the information processing unit 4104 may first divide the artists found in the playback device 420 into different tiers based on the playback information such as play counts, the number of songs in the library, etc. The information processing unit 4104 may further assign a predetermined event searching distance d1 to search the event for the first tier artists, a searching distance d2 (shorter than d1) for the second tire artists, and a searching distance d3 (shorter than d2) for the third tier artists, and so on, as can be seen in the example of FIG. 4i.

Figure 4J:
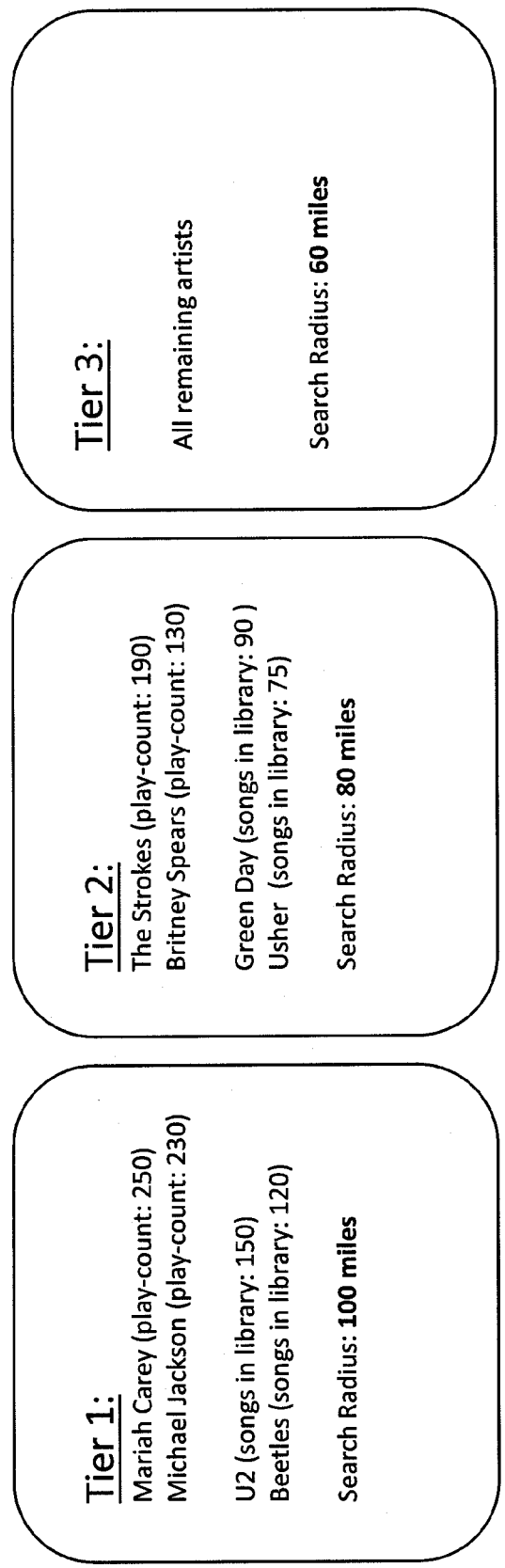

As exemplified in FIG. 4j, the information processing unit 4104 divided the artists found in the playback device 420 into three tiers according to the playback information stated above, where the artists in tier 1 are either the top two artists with the most play count (Mariah Carey: 250; Michael Jackson: 230), or the top two artists with the most songs in the library (U2: 150; Beatles: 120), and the first content retrieving unit 4102 is configured to search events for singers in tier 1 with the longest searching distance (100 miles) among the three tiers. The searching distance is shorter for the tier 2 singers (80 miles) and the shortest for the tier 3 singers (60 miles).

Figure 5:
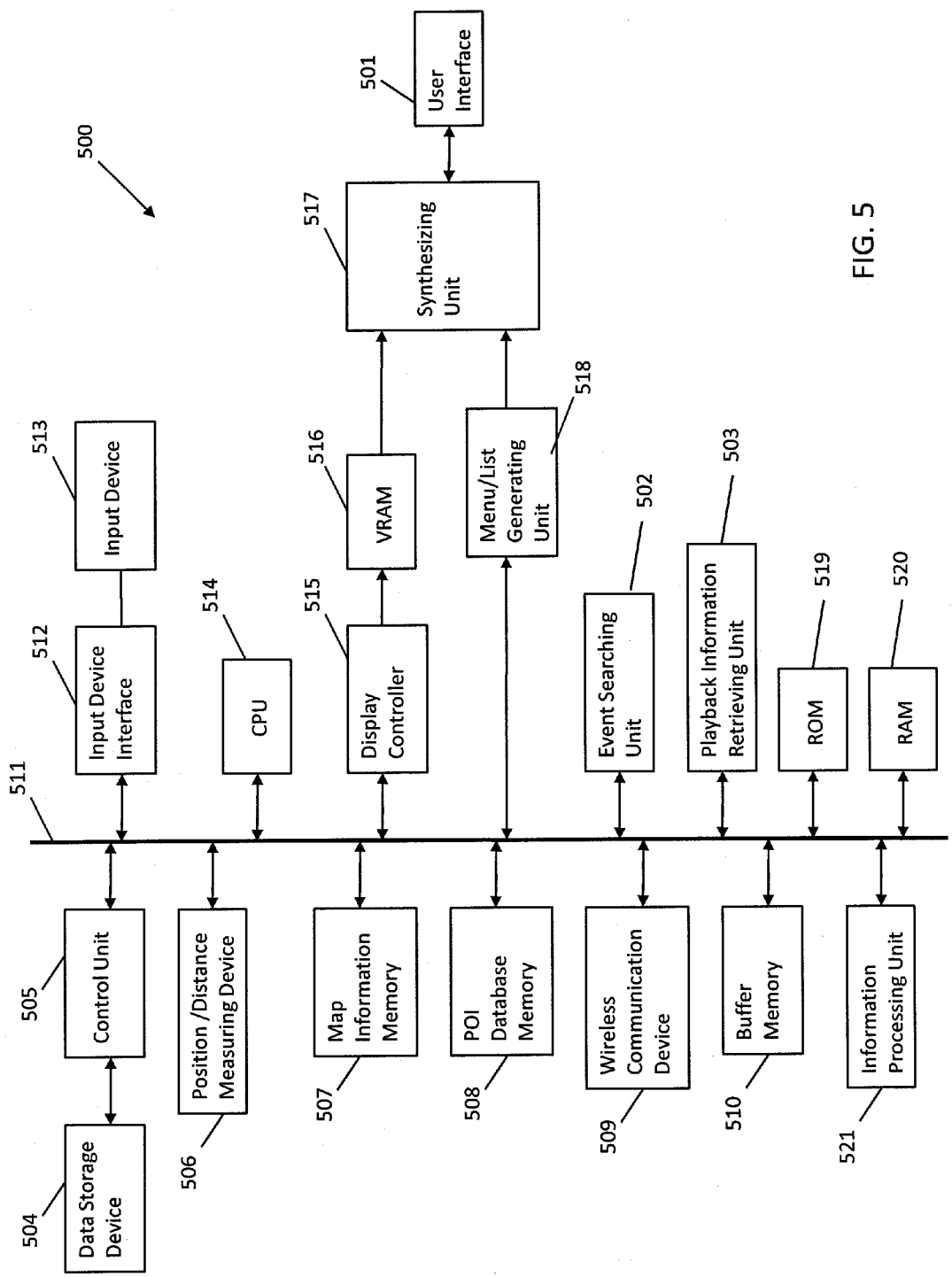
FIG. 5 illustrates a functional block diagram showing an example of structure of a navigation system including the content delivery system to implement the method and apparatus to provide event notification to the user.

FIG. 5 is a block diagram showing an example of structure of a navigation system 500 for implementing the present invention in another aspect. The navigation system 500 includes a user interface 501, an event searching unit 502 adapted to search event, such as art, concert, sport, etc. in a predetermined distance according to the user's current location, a playback information retrieving unit 503 adapted to retrieve playback information from the playback device 420 and an information processing unit 521. In one embodiment, the user interface 501 is a display unit which is configured to display maps, POIs, routing and event information. In another embodiment, the event searching unit 502 is communicatively coupled with a wireless communication device 509 to repeatedly conduct event search within a predetermined distance via the communication network according to the user's current location. For example, the event searching unit 502 may conduct event search for concert events through the Internet via the communication network, such as WiFi. Moreover, as stated above, the searching distance can be determined based on the playback information indicating the user's preference. In still another embodiment, the searching distance can be modified based on the recommendations from the user's social networking websites, such as Facebook, MySpace, Twitter, etc. The information processing unit 521 is configured to perform the same function as detailed above with respect to the information processing unit 4104 in FIGS. 4b and 4c.

The system also includes a data storage device 504 such as a hard disc, CD-ROM, DVD or other storage means for storing the map data; a control unit 505 for controlling an operation for reading the information from the data storage device 504; and a position and distance measuring device 506 for measuring the present vehicle position or user position. For example, the position and distance measuring device 506 has a speed sensor for detecting a moving distance, a gyroscope for detecting a moving direction, a microprocessor for calculating a position, a GPS (global positioning system) receiver for receiving GPS signals from satellites for calculating a current position of the user. In one embodiment, the event searching unit 502 is communicatively coupled with the position and distance measuring device 506 to determine the distance between the event and the user's current position. In another embodiment, the navigation system 500 may be portable.

The block diagram of FIG. 5 further includes a map information memory 507 for storing the map information which is read from data storage 504, a database memory 508 for storing database information such a point of interest (POI) information which is read out from the data storage device 504, an input device 513 for executing a menu selection operation, an enlarge/reduce operation, a destination input operation, . . . etc. and an input device interface 512. In one embodiment, the input device 513 is a remote controller.

Still referring to FIG. 5, the navigation system 500 includes a bus 511 for interfacing the above units in the system, a processor (CPU) 514 for controlling an overall operation of the navigation system 500, a ROM 519 for storing various control programs such as a route search program and a map matching program necessary for navigation control, a RAM 520 for storing a processing result such as a guide route and an event notification, a display controller 515 for generating map image (a map guide image and an arrow guide image) on the basis of the map information, a VRAM 516 for storing images generated by the display controller 515, a menu/list generating unit 518 for generating menu image/various list images, a synthesizing unit 517, a wireless communication device 509 to retrieve data from a remote server, the Internet or other communication networks, and a buffer memory 510 for temporary storing data for ease of data processing.

In one embodiment, the playback information retrieving unit 503 can retrieve the playback information such as play count, artist names, etc. from the playback device 420. In another embodiment, the playback information retrieving unit 503 can be communicatively coupled with the wireless communication device 509 to retrieve the user's preference about art, music or sport, etc. from the remote server, the Internet or other communication interfaces via the communication network.

According to another aspect in the present invention illustrated in the flowchart of FIG. 6, a method of providing event information to a user comprises the steps of: searching for first content from at least one content provider 610; retrieving second content from at least one playback device 620, comparing the first content with the second content in at least one attribute 630; determining whether to provide notification of the first content to the user 640; and providing at least one first content information to the user 650. As stated above, the first content may include, but not limited to art, concert and sport events, while the second content may include playback information such as artist names, song names, genres, play counts, etc. stored in the playback device 420. In one embodiment, the step of retrieving the first content from at least one content provider includes the step of communicatively coupling with the communication network 430 through which the first content can be transmitted to the terminal 410. The step of comparing the first content with the second content in at least one attribute 630 includes the step of comparing the playback information in the playback device 420 with the event information. If there is any match found, the content delivery system 400 proceeds to determine whether to provide notification of the event to the user in step 640. On the contrary, if there is no match found, the content delivery system 400 will keep searching for event information along the route if the user is driving thereon.

The step of determining whether to provide notification of the first content to the user 640 includes the step of analyzing a plurality of factors including, but not limited to, a location of the first content (is it within a predetermined distance from the user's current location?) 641, future occurrence 642, and ticket availability 643. If at least one factor is negative, the first content information may not be delivered to the user, and the first content retrieving unit 4102 retrieves the first content again as depicted in step 610. However, if all factors indicate positive, the event information is provided to the user in step 650. In one embodiment, the step of providing at least one first content information to the user in step 650 includes the step 651 of providing ticket purchasing service to the user.

In some embodiments, the method allows the user to receive event information specific to at least one artist selected by the user as illustrated in the flowchart of FIG. 7. In step 710, the terminal 410' (see FIGS. 4*q*-4*h*) is used to retrieve the artist information from the playback device 420 and display such information on the terminal 410', and search for the event of at least one artist selected by the user, as illustrated in steps 720 and 730. Similarly, the step of retrieving event information of at least one selected artist includes the step of communicatively coupling with the communication network 430 through which the event information can be transmitted to the terminal 410'. If there is no event for the selected artist, the user is allowed to search for future event for the selected artist or purchase the selected artist's album(s) in step 731. In another embodiment, the user is allowed to select at least one other artist from the playback information in step 720.

If the event of the selected artist is found, like step 640 in FIG. 6, the terminal 410' determines whether to provide the event information to the user in step 740 by analyzing a plurality of factors including, but not limited to, location of the first content (is it within a predetermined distance from the user's current location?) 741, future occurrence 742, and ticket availability 743. If at least one factor is negative, the event information may not be delivered to the user, and the user is allowed to select at least one other artist from the playback information in step 720. However, if all factors indicate positive, the event information is provided to the user in step 750. In one embodiment, the step of providing at least one first content information to the user in step 750 includes the step 751 of providing ticket purchasing service to the user 751.

In another embodiment, the method is configured to determine the user's preference based on the playback information in the playback device 420, and modify the event searching distance according to the user's preference. As depicted in the flowchart of FIG. 8, the playback information is retrieved from the playback device 420 in step 810, and the artists in the playback information are divided into different tiers according to the play count, number of songs, etc. in step 820. As can be seen in FIGS. 4*g* and 4*h*, the singers having the highest play counts or highest number of songs belong to tier 1, the second most play counts or second most number of songs belong to tier 2, and so on. As stated above, play count or number of songs can highly indicate the user's preference of one specific artist, and the event searching distance can be redefined in step 830, such that the event searching distance can be the longest for the tier 1 artists, shorter for the tier 2 singers and so on. In step 840, the event searching unit 502 or the first content retrieving unit 4102 is adapted to search event information of the artists in each tier according to the redefined searching distance. Steps 850, 860 and 861 are similar to the steps 740, 750 and 751 in the method of FIG. 7.

Having described the invention by the description and illustrations above, it should be understood that these are exemplary of the invention and are not to be considered as limiting. Accordingly, the invention is not to be considered as limited by the foregoing description, but includes any equivalents.

The invention claimed is:

1. A content delivery system comprising:
   a first content retrieving unit configured to retrieve first content information from at least one communication interface;
   a second content retrieving unit configured to retrieve second content information directly from at least one electronic device coupled to the content delivery system;
   a user interface configured to display at least a portion of said first content information;
   a position and distance measuring unit configured to detect a current position of a user and provide distance information between the user's current position and at least one location of the first content; and
   an information processing unit configured to determine whether to provide and display at least a portion of said first content information to the user by managing said first content and second content information and analyzing at least the distance information provided by the position and distance measuring unit;
   wherein the first content information comprises event information which is transmitted from at least one content provider to said communication interface, and the second content information comprises playback information including artist names, a number of songs belonged to each artist, play counts of each song, and a favorite radio station directly retrieved from said electronic device which is a playback device coupled to the content delivery system,
   wherein said information processing unit divides the artists in the playback information into different tiers according to at least a portion of the playback information indicating the user's preference and assigns a searching distance to each tier, where said information processing unit assigns a longest searching distance to search for event information of the artists to a tier with the highest preference, and the searching distance is descending in each tier therefrom, and
   wherein the user interface is configured to allow the user to select at least one artist from said playback information in order to retrieve the artist's event information, and to search for future event for the selected artist or purchase the selected artist's album, if there is no event for the selected artist.

2. The content delivery system of claim 1, wherein the information processing unit compares said event information with said playback information and if there is at least one matching information found, the information processing unit further analyzes a plurality of factors including future event occurrence, event ticket availability and the distance information provided by the position and distance measuring unit, and if at least one factor indicates negative, the matching information is not provided and displayed to the user.

3. The content delivery system of claim 1, further comprising a new city detecting unit communicatively coupled with the position and distance measuring device and at least one map information memory to detect whether the user is entering into a new city, and the first content retrieving unit is triggered if the user is approaching or entering the new city.

4. The content delivery system in claim 1, wherein the user is allowed to select at least one artist from said playback information to retrieve the artist's event information.

5. A method of delivering content to a user comprising the steps of:

retrieving first content information from at least one communication interface;

retrieving second content information directly from at least one electronic device coupled to a content delivery system;

detecting a current position of the user and determining a distance between the user's current position and a destination;

determining whether to deliver and display at least a portion of the first content information to the user; and displaying at least a portion of said first content information to the user;

wherein the first content information comprises event information transmitted from at least one content provider to said communication interface, and the second content information comprises playback information including artist names, a number of songs belonged to each artist, play counts of each song, and a favorite radio station directly retrieved from said electronic device which is a playback device coupled to the content delivery system;

wherein the step of determining whether to display at least a portion of the first content information to the user further includes the step of dividing the artists in the playback information into different tiers according to at least a portion of said playback information indicating the user's preference, and assigning a longest searching distance to search for event information of the artists to a tier with the highest preference, and the searching distance is descending in each tier therefrom, and wherein the user is allowed to select at least one artist from said playback information in order to retrieve the artist's event information, and to search for future event for the selected artist or purchase the selected artist's album, if there is no event for the selected artist.

6. The method of claim 5, wherein the step of retrieving for first content information from at least one communication interface includes the step of transmitting said first content information from at least one content provider to said communication interface via wireless communication.

7. The method of claim 5, wherein the step of determining whether to deliver and display at least a portion of the first content to the user comprises the step of matching said first and second content information, and if there is at least one matching information found, then further analyzing a plurality of factors including future event occurrence, event ticket availability and whether the event location is within a predetermined distance from the user's current location, and if at least one factor indicates negative, said matching information is not provided to the user.

8. The method of claim 5, further comprising a step of selecting at least one artist from said playback information to retrieve the artist's event information.

9. The method of claim 5, wherein the step of detecting a current position of the user and determining a distance between the user's current position and a destination comprises a step of detecting whether the user is approaching or entering a new city.

10. A multifunctional electronic device comprising:
a display unit;
at least one information retrieving unit;
an information processing unit;
a user position detecting device; and
a playback device coupled to the multifunctional electronic device, wherein a first information retrieving unit retrieves event information from a communication interface through a communication network, a second information retrieving unit retrieves playback information from said playback device, and the information processing unit determines whether to provide and display at least a portion of said event information by comparing said event with said playback information;

wherein said information processing unit divides the artists into different tiers according to at least a portion of the playback information including artist names, a number of songs belonged to each artist, play counts of each song, and a favorite radio station each indicating the user's preference, and assigns a longest searching distance to search for event information of the artists to a tier with the highest preference, and the searching distance is descending in each tier therefrom, and wherein the user is allowed to select at least one artist from said playback information in order to retrieve the artist's event information, and to search for future event for the selected artist or purchase the selected artist's album, if there is no event for the selected artist.

11. The multifunctional electronic device of claim 10, wherein the information processing unit compares said event information with said playback information and if there is at least one matching information found, the information processing unit further analyzes the factors including future event occurrence, event ticket availability and whether the event location is within a predetermined distance from the user's current location, and if at least one factor indicates negative, the matching information is not provided and displayed to the user.

12. The multifunctional electronic device of claim 10, wherein the user is allowed to select at least one artist from said playback information to retrieve the artist's event information.

* * * * *